United States Patent
Ebi

(10) Patent No.: US 9,766,770 B2
(45) Date of Patent: Sep. 19, 2017

(54) VEHICLE NAVIGATION DEVICE

(71) Applicant: DENSO CORPORATION, Kariya, Aichi-pref. (JP)

(72) Inventor: Masaki Ebi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 252 days.

(21) Appl. No.: 14/761,276

(22) PCT Filed: Dec. 23, 2013

(86) PCT No.: PCT/JP2013/007524
§ 371 (c)(1),
(2) Date: Jul. 15, 2015

(87) PCT Pub. No.: WO2014/112017
PCT Pub. Date: Jul. 24, 2014

(65) Prior Publication Data
US 2015/0346914 A1    Dec. 3, 2015

(30) Foreign Application Priority Data
Jan. 18, 2013  (JP) .................................. 2013-007482

(51) Int. Cl.
*G06F 3/0481* (2013.01)
*G06T 11/20* (2006.01)
(Continued)

(52) U.S. Cl.
CPC ........... *G06F 3/0481* (2013.01); *G01C 21/06* (2013.01); *G01C 21/36* (2013.01); *G01C 25/005* (2013.01); *G06T 11/206* (2013.01)

(58) Field of Classification Search
CPC ..... G06F 3/0481; G06T 11/206; G01C 21/06; G01C 21/36; G01C 25/005
See application file for complete search history.

(56) References Cited

U.S. PATENT DOCUMENTS

2004/0210383 A1* 10/2004 Sato ..................... G08G 1/0969
                                                           701/469
2005/0052413 A1*  3/2005 Ueno ....................... G09G 5/42
                                                           345/158
(Continued)

FOREIGN PATENT DOCUMENTS

EP          0539145 A1    4/1993
JP         H05113342 A    5/1993
(Continued)

OTHER PUBLICATIONS

International Search Report and Written Opinion (in Japanese with English Translation) for PCT/JP2013/007524, mailed Jan. 28, 2014; ISA/JP.

*Primary Examiner* — Anil Bhargava
(74) *Attorney, Agent, or Firm* — Harness, Dickey & Pierce, P.L.C.

(57) ABSTRACT

A vehicle navigation device includes a detection portion detecting a position and a travel direction of a vehicle, an arithmetic processing portion specifying the position and the travel direction of the vehicle, a display portion, and a control portion controlling the display portion to display vehicle mark on road map in normal display style. The arithmetic processing portion performs zero point correction to set zero point for an output from a gyro sensor. The control portion switches the display style from the normal display style to a correction-oriented display style in which display information is limited in response to the startup of the vehicle navigation device, and maintains the correction-oriented display style during a zero point correction period that is elapsed from the startup of the vehicle navigation device to a completion of the zero point correction.

5 Claims, 6 Drawing Sheets

(51) Int. Cl.
*G01C 21/06* (2006.01)
*G01C 21/36* (2006.01)
*G01C 25/00* (2006.01)

(56) References Cited

U.S. PATENT DOCUMENTS

| | | | |
|---|---|---|---|
| 2007/0233381 | A1 | 10/2007 | Okeya |
| 2010/0292915 | A1* | 11/2010 | Ishigami ................ G01C 21/26 |
| | | | 701/532 |
| 2014/0012499 | A1 | 1/2014 | Hirose et al. |

FOREIGN PATENT DOCUMENTS

| | | | |
|---|---|---|---|
| JP | H07318363 A | 12/1995 |
| JP | 3218876 B2 | 10/2001 |
| JP | 3628046 B2 | 3/2005 |
| JP | 2005291935 A | 10/2005 |
| JP | 4944137 B2 | 5/2012 |
| JP | 2012137455 A | 7/2012 |
| WO | WO-2008099475 A1 | 8/2008 |
| WO | WO-2012131836 A1 | 10/2012 |

* cited by examiner

ABLE TO SWITCH TO
NORMAL DISPLAY WINDOW

UNABLE TO SWITCH TO
TRAVEL GUIDE DISPLAY WINDOW

VEHICLE NAVIGATION DEVICE

CROSS REFERENCE TO RELATED APPLICATIONS

This application is a U.S. National Phase Application under 35 U.S.C. 371 of International Application No. PCT/JP2013/007524 filed on Dec. 23, 2013 and published in Japanese as WO 2014/112017 A1 on Jul. 24, 2014. This application is based on and claims the benefit of priority from Japanese Patent Application No. 2013-007482 filed on Jan. 18, 2013. The entire disclosures of all of the above applications are incorporated herein by reference.

TECHNICAL FIELD

The present disclosure relates to a vehicle navigation device including a gyro sensor as a sensor to detect a current position and a travel direction of a vehicle.

BACKGROUND ART

A vehicle navigation device detects a vehicle's current position and travel direction. The vehicle navigation device displays a vehicle mark corresponding to the detection result along with a road map on a display apparatus to provide a driver with vehicle travel guidance.

There is known the vehicle navigation device including a gyro sensor (e.g., see patent literatures 1 and 2). The vehicle navigation device uses known dead-reckoning navigation to detect the vehicle's position and travel direction based on an angular velocity detected by the gyro sensor and a detection signal (vehicle speed or acceleration) from a vehicle speed sensor or an acceleration sensor.

Characteristics of an angular velocity detected by the gyro sensor vary with the ambient environment such as temperature. To solve this issue, the vehicle navigation device including the gyro sensor generally performs zero point correction when the navigation device is started up in response to a power-on or when the vehicle stops from a traveling state (e.g., see patent literature 3). The zero point correction settles a zero point for gyro sensor output.

The zero point correction is performed on the gyro sensor when the vehicle navigation device is started or the vehicle stops travelling. This is because, the vehicle is assumed to be in stationary state in these cases and no angular velocity is applied to the gyro sensor (i.e., angular velocity=0).

After the power is turned on, the gyro sensor requires time to stabilize an output. At startup, the vehicle navigation device performs the zero point correction after an output from the gyro sensor stabilizes.

The zero point correction performed at startup of the vehicle navigation device requires a longer time than the zero point correction performed after the vehicle starts traveling. A driver may start the vehicle before the zero point correction is completed when the zero point correction is performed at the startup of the vehicle navigation device.

The zero point correction is interrupted when the driver starts the vehicle to travel before the normal completion of the zero point correction. In this case, the zero point cannot be settled on the gyro sensor until the next zero point correction. The next zero point correction may be carried out when the vehicle stops after the start of the travelling. Thus, when the zero point correction fails to be normally completed before the start of travelling, the driver is provided with the travel guidance based on incorrect angular velocity information.

The travel guidance displays a road map on the display apparatus. The displayed map contains a vehicle mark that indicates the vehicle's position and travel direction. Occupants of the vehicle may feel uncomfortable due to an abnormal phenomenon such as a straying or drifting vehicle mark.

The vehicle navigation device performs map matching that matches the vehicle position with a road on the road map. When map data does not contain road data corresponding to the vehicle position, a symbol mark is displayed on the display apparatus to notify this situation to the occupant (for example, refer to patent literature 4).

When the zero point correction is not performed on the gyro sensor immediately after the vehicle navigation device starts, the failure of the zero point correction may be displayed on the display apparatus by applying the technology described above. With this configuration, the occupant can be notified of the situation that the vehicle mark displayed on the road map is incorrect.

However, even though the failure of the zero point correction is notified to the occupant, a straying vehicle mark is still displayed on the road map during the travelling. Thus, the proposed technology does not provide a fundamental solution and fails to prevent a user from developing a feeling of distrust.

PRIOR ART LITERATURES

Patent Literature

Patent Literature 1: JP 3218876 B2
Patent Literature 2: JP 3628046 B2
Patent Literature 3: JP 2012-137455 A
Patent Literature 4: JP H7-318363 A

SUMMARY OF INVENTION

In view of the foregoing difficulties, it is an object of the present disclosure to provide a gyro sensor-equipped vehicle navigation device that can keep an occupant of a vehicle free from an uncomfortable or confused feeling to a travel guidance displayed on a display portion when a zero point correction is interrupted caused by a start of travelling immediately after a startup of the navigation device.

According to an aspect of the present disclosure, a vehicle navigation device includes a detection portion, an arithmetic processing portion, a display portion, and a control portion. The detection portion detects a position and a travel direction of a vehicle and outputs a detection signal. The arithmetic processing portion specifies the position and the travel direction of the vehicle based on the detection signal output from the detection portion. The display portion displays a road map and a vehicle mark corresponding to a display style. The control portion controls the display portion to display the vehicle mark on the road map in a normal display style. The vehicle mark in the normal display style indicates both the position and the travel direction of the vehicle specified by the arithmetic processing portion. The detection portion includes a gyro sensor that detects an angular velocity of the vehicle. The arithmetic processing portion performs a zero point correction in order to set a zero point for an output from the gyro sensor under a condition that the vehicle maintains a stationary state after a startup of the navigation device. The control portion switches the display style of the display portion from the normal display style to a correction-oriented display style in response to the startup of the navigation device. The correction-oriented display style limits display information that is available in the normal display style. The control portion maintains the correction-oriented display style as the display style of the display portion during a zero point correction period that is elapsed from the startup of the navigation device to a completion of the zero point correction.

With the above vehicle navigation device, when the zero point correction is interrupted after the startup of the navigation device and detection of correct present position and correct travel direction is failed, a straying or drifting display of a vehicle mark indicating the travel direction of the vehicle can be restricted and the occupant of the vehicle can be kept free from an uncomfortable or confused feeling to the straying or drifting vehicle mark.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
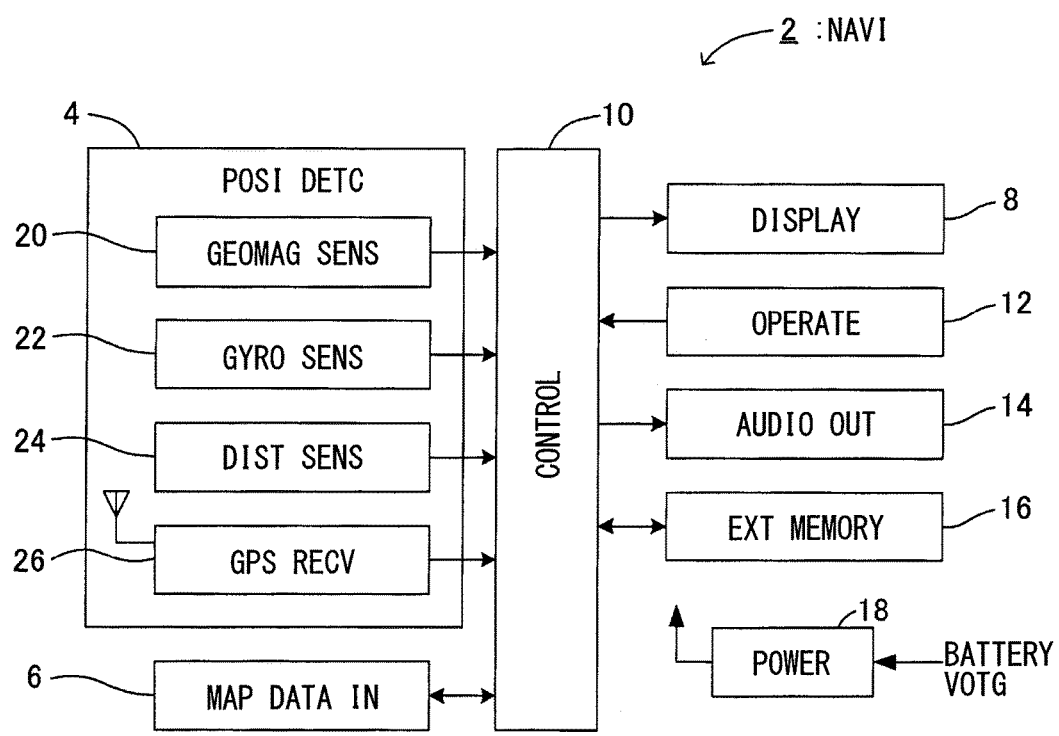
FIG. 1 is a block diagram illustrating an entire configuration of the vehicle navigation device according to an embodiment of the disclosure.

Embodiments of the present disclosure will be described with reference to the accompanying drawings. The disclosure is not limited to the embodiments described below. The disclosure is applicable to an embodiment resulting from partially omitting the embodiment as far as the problem can be solved. The disclosure is also applicable to all possible embodiments that do not depart from the essence of the disclosure specified by only the words described in the appended claims. Reference numerals and symbols used in the description of the embodiment are also used in the claims as needed for the purpose of facilitating understanding of the disclosure related to the claims and are not intended to limit the technical scope of the disclosure related to the claims.

First Embodiment

As illustrated in FIG. 1, a vehicle navigation device (NAVI) 2 according to an embodiment includes a position detection portion (POSI DETC) 4, a map data input portion (MAP DATA IN) 6, a display portion (DISPLAY) 8, a manipulation portion (OPERATE) 12, an audio output portion (AUDIO OUT) 14, an external memory (EXT MEMORY) 16, and a control circuit (CONTROL) 10 to which the components are connected. The vehicle navigation device 2 is hereinafter referred to as a navigation device 2.

The control circuit 10 is configured as a known computer including a central processing unit (CPU), read only memory (ROM), random access memory (RAM), input/output (I/O), and a bus line connecting these components. The ROM stores a program to implement functions as the navigation device. The CPU performs specified arithmetic processing based on the program to implement functions as the navigation device.

The position detection portion 4 enables the control circuit 10 to obtain a vehicle position or a travel direction. The position detection portion 4 includes a geomagnetism sensor (GEOMAG SENS) 20, a gyro sensor (GYRO SENS) 22, a distance sensor (DIST SENS) 24 to compute a traveled distance, and a global positioning system receiver (GPS RECV) 26 to detect a vehicle position based on a radio wave from a satellite. The global positioning system receiver 26 is hereinafter referred to as a GPS receiver 26.

The sensors are prone to errors whose characteristics differ from each other. The control circuit 10 corrects detection signals from the sensors and uses the corrected signals to specify a vehicle position or a travel direction. The position detection portion 4 may include a part of the sensors depending on the accuracy of the sensors.

The map data input portion 6 supplies map data such as matching data to improve the position detection accuracy, map drawing data, and route search data. The databases are generally stored in a read-only storage medium such as CD-ROM or DVD-ROM, for example. The databases may also be stored in a writable storage medium such as a memory card or a hard disk.

Figure 2A:
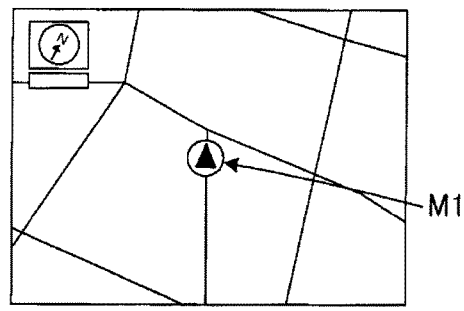
FIG. 2A and FIG. 2B are explanatory diagrams illustrating respective travel guidance display windows corresponding to display modes.

The display portion 8 may be provided by a liquid crystal display, for example. As illustrated in FIG. 2A, a display window of the display portion 8 displays a road map and vehicle mark M1. The road map is generated near the vehicle based on map data supplied from the map data input portion 6. Vehicle mark M1 indicates a vehicle position and a travel direction detected by the position detection portion 4.

The display window of the display portion 8 displays a map for travel guidance. The display window also displays various manipulation switches such as a manipulation switch to change a map scale and a manipulation switch to change a display style. The switches are overlapped with the map. The display style may include two-window display, single-window display, 3D display, and 2D display.

The display portion 8 also displays a menu display window including a switch to set the navigation device 2 or select a function to be performed on the display window. The manipulation portion 12 includes a touch panel integrated with the display portion 8 or a mechanical switch provided around the display portion 8, for example. The manipulation portion 12 is used to scroll a displayed map, enter a character or a number to search for an intended map or facility, or manipulate various switches.

The audio output portion 14 outputs an audio for travel guidance and includes a voice synthesis circuit and a speaker. The external memory 16 includes a large-capacity readable writable storage medium such as a memory card or an HDD. The external memory 16 stores various types of data such as text data, image data, and audio data.

The navigation device 2 also includes a power supply portion (POWER) 18. The power supply portion 18 generates a power supply voltage (direct-current constant voltage) to be provided to the above-described respective portions. The power supply portion 18 generates the power supply voltage in response to manipulation of an accessory switch or an ignition switch of the vehicle by using the power supplied from a battery voltage (BATTERY VOTG) of a battery mounted on a vehicle.

The navigation device 2 is supplied with the power when a driver turns on the accessory switch or the ignition switch. The power supply portion 18 starts supplying the power to the portions to start the respective portions.

After startup, the control circuit 10 performs an initialization process to initialize various parameters and then allows the position detection portion 4 to detect a vehicle position and a travel direction. The control circuit 10 allows the display portion 8 to display a map containing vehicle mark M1 corresponding to the detection result so as to provide a driver with travel guidance for the vehicle.

The navigation device 2 also includes the gyro sensor 22. Similarly to the prior art, the control circuit 10 performs zero point correction on the gyro sensor 22 immediately after the startup of the navigation device 2 when the traveling vehicle maintains a stationary state.

The zero point correction samples outputs from the gyro sensor 22 during a specified period to find a zero point corresponding to angular velocity=0 when no angular velocity is applied to the gyro sensor 22 (i.e., when the vehicle stops). The zero point correction stores the value as a correction value in the internal memory (such as nonvolatile RAM).

Figure 3:
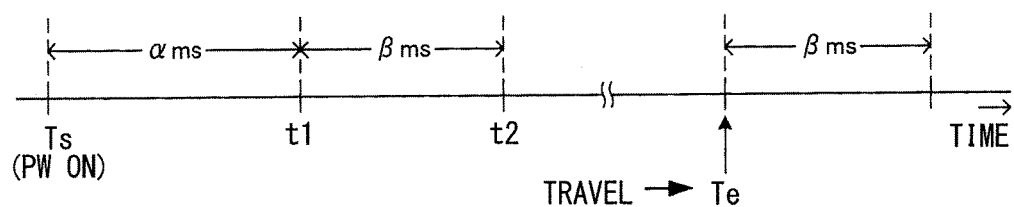
FIG. 3 is a timing diagram illustrating timing for a control circuit to perform zero point correction.

As illustrated in FIG. 3, the control circuit 10 requires a specified time period (sampling time) indicated as $\beta$ ms to complete the zero point correction. The control circuit 10 interrupts the zero point correction when the stopped vehicle starts traveling while the zero point correction is in progress.

The gyro sensor 22 requires a specified time period to stabilize an output after the power supply is turned on. Therefore, time period $\alpha+\beta$ ms is required to complete the zero point correction after the power is supplied to the navigation device 2 and before the vehicle starts traveling. Herein, $\alpha$ ms denotes the specified time period required to stabilize an output from the gyro sensor 22 and $\beta$ ms denotes the specified time period for the control circuit 10 to process the zero point correction. Time period $\alpha$ ms required to stabilize an output from the gyro sensor 22 is also referred to as a first period. Time period $\beta$ ms to process the zero point correction is also referred to as a second period.

The control circuit 10 interrupts the zero point correction when the vehicle changes from a stopped state to a traveling state before the expiration of the time period $\alpha+\beta$ ms. The correction value stored in the memory does not correspond to the state of the gyro sensor 22 until the zero point correction is completed in the stationary state of the vehicle.

Since the correction value stored in the memory does not exactly correspond to the state of the gyro sensor 22, the vehicle position and the travel direction cannot be detected accurately if the correction value stored in the internal memory is used to correct an output from the gyro sensor 22. Vehicle mark M1 strays or drifts on the road map displayed on the display portion 8 when the travel guidance is performed based on the incorrectly detected vehicle position and travel direction as illustrated in FIG. 2A. A driver may feel uncomfortable or confused with the straying or drifting mark of the vehicle.

Figure 2B:
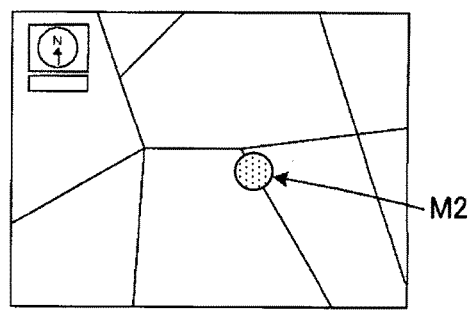

Regarding above-described difficulty, the control circuit 10 according to the present embodiment is made to limit or reduce information displayed on the display portion 8 as illustrated in FIG. 2B until the zero point correction is successfully completed on the gyro sensor 22 after the startup of the navigation device. The control circuit 10 hides or does not display a straying or drifting vehicle mark to prevent the driver from feeling uncomfortable or confused.

Specifically, until the zero point correction is completed on the gyro sensor 22, the control circuit 10 changes the display style of the display portion 8 to a correction-oriented display style. The correction-oriented display style limits or reduces the display information available in a normal display style for travel guidance illustrated in FIG. 2A. To do this, the control circuit 10 imposes limitations (1) through (3) described below on the normal display style.

(1) Change the vehicle mark displayed on the display portion 8 from vehicle mark M1 clearly indicating the travel direction to vehicle mark M2 indistinctly or unrecognizably displaying the travel direction.

(2) Change the display style from a style in which the vehicle travel direction is displayed upward to a style in which the north direction is displayed upward when the display portion 8 displays a road map in the style the vehicle travel direction points upward.

(3) Limit the scale change of a road map displayed on the display portion 8 to prevent the display portion 8 from zooming in on the map at the scale of, for example, 200 meters or shorter that is available in the normal display style.

Figure 4:
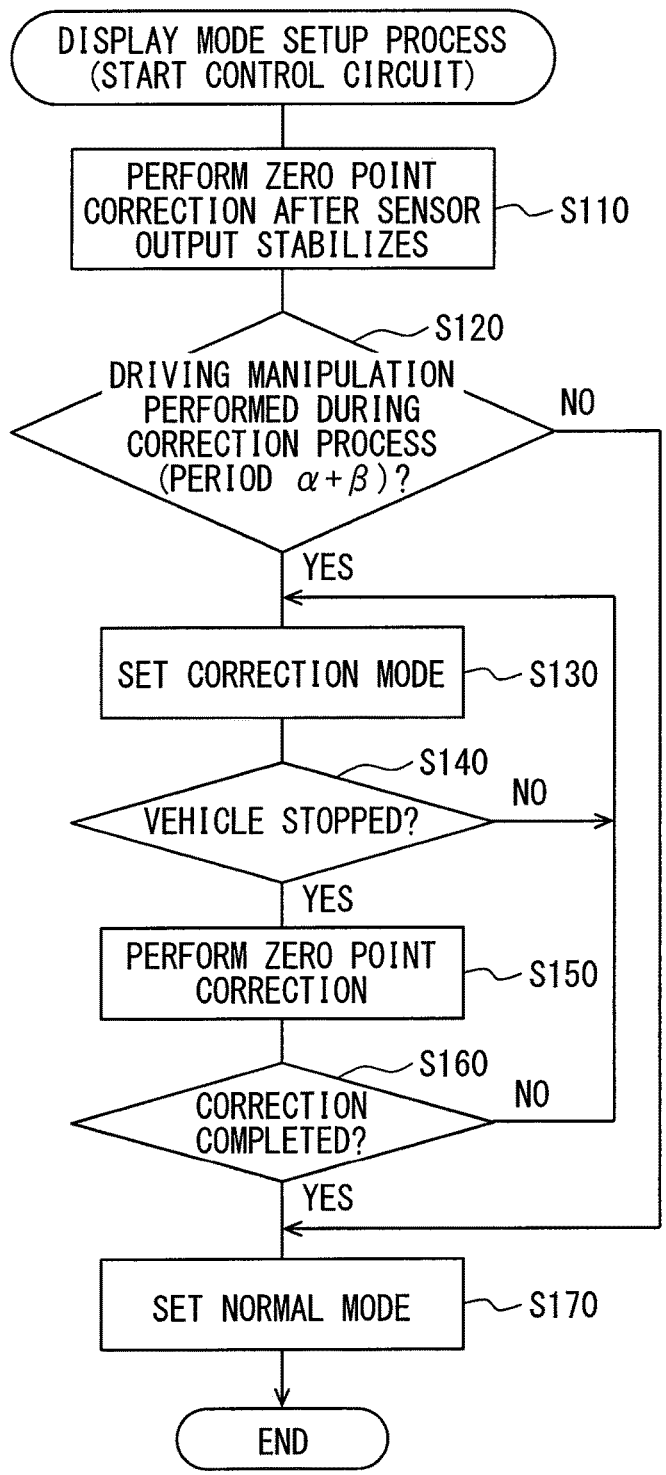
FIG. 4 is a flowchart illustrating a display mode setup process performed by the control circuit.

The following describes a display mode setup process performed on the control circuit 10 to change the display style. As illustrated in FIG. 4, the control circuit 10 performs the display mode setup process at a time point Ts when the control circuit 10 is started up in response to the power-on (PW ON) of the navigation device 2.

When the display mode setup process starts, the control circuit 10, at S110, performs the zero point correction that sets the zero point for an output from the gyro sensor 22. As described above, the control circuit 10 performs the zero point correction process on condition that the vehicle is in a stationary state.

The process at S110 is performed immediately after the startup of the control circuit 10 starts (in other words, immediately after the startup of the gyro sensor 22). At S110, the control circuit 10 waits until an output from the gyro sensor 22 is stabilized. The control circuit 10 then performs the zero point correction on the gyro sensor 22.

Specifically, as described above, the control circuit 10 samples outputs from the gyro sensor 22 at a specified period to find the zero point corresponding to angular velocity=0. The control circuit 10 stores the zero point as a correction value for angular velocity computation in the internal memory.

At S120, the control circuit 10 determines whether or not the vehicle starts traveling in response to driver's driving manipulation during the execution of the zero point correction at S110. A duration in which the zero point correction process is performed corresponds to an elapse of time period $\alpha+\beta$ ms. The elapsed of time period corresponds to a sum of a time period $\alpha$ starting at the time point Ts and ending at a time point t1 and a time period $\beta$ starting at the time point t1 and ending at a time point t2 as illustrated in FIG. 3. Herein, the control circuit 10 starts up at the time point Ts. In other words, the control circuit 10 determines whether or not an angular velocity is applied to the gyro sensor 22 during the execution of the zero point correction.

At S120, when the control circuit 10 determines that the vehicle starts travelling during the zero point correction process, that is, the zero point correction immediately after the startup is interrupted, the control circuit 10 proceeds to S130. At S130, the control circuit 10 sets a correction-oriented display mode as display mode for the display portion 8. Setting the display mode to the correction-oriented display mode displays a travel guidance display window in the correction-oriented display style as illustrated in FIG. 2B.

At S140, the control circuit 10 determines whether or not the vehicle stops. When the vehicle does not stop, the control circuit 10 returns to S130 and waits until the vehicle stops. At S140, when the control circuit 10 determines that the vehicle stops at a time point Te, the control circuit 10 proceeds to S150 and performs the zero point correction on the gyro sensor 22.

At S150, unlike S110, the control circuit 10 performs the zero point correction without awaiting a stabilized output from the gyro sensor 22. This is because the output of the gyro sensor 22 has already been stabilized when the navigation device is started up.

At S150, the control circuit 10 interrupts the zero point correction when the vehicle is manipulated to start travelling during the execution of the zero point correction (during β ms). At S160, the control circuit 10 determines whether or not the zero point correction is successfully completed at S150. If the zero point correction is not completed, the control circuit 10 returns to S130. If the zero point correction is successfully completed, the control circuit 10 proceeds to S170.

At S120, when the control circuit determines that the vehicle does not start travelling during the execution of zero point correction, the control circuit 10 proceeds to S170. At S170, the control circuit 10 sets a normal display mode as the display mode for the display portion 8. The control circuit 10 displays the travel guidance display window in the normal display style as illustrated in FIG. 2A and terminates the display mode setup process.

As described above, the control circuit 10 in the navigation device 2 according to the embodiment starts to perform the zero point correction on the gyro sensor 22. The control circuit 10 performs the display mode setup process until the zero point for the gyro sensor 22 is set as a correction value.

The display mode setup process changes the display mode to display a road map for travel guidance on the display portion 8 to the correction-oriented display mode that limits or reduces the display information available in the normal display mode. For example, the display mode setup process changes the vehicle mark displayed on the road map to vehicle mark M2 that displays only the vehicle position and indistinctly or unrecognizably displays the travel direction.

For example, the correction-oriented display mode applies a limitation to the magnification (scale) in the normal display mode to display a road map on the display portion 8. For example, the correction-oriented display mode fixes the road map orientation so that the upward orientation of the road map corresponds to the north direction.

After the navigation device 2 is started up, the vehicle may be manipulated to start travelling before the proper completion of the first zero point correction and the zero point correction may be interrupted in the middle. In this case, an incorrect zero point correction value may be used to incorrectly detect an angular velocity (consequently, a vehicle position and a travel direction). Even in such a case, the navigation device 2 can prevent display of the vehicle mark that indicates an incorrect travel direction on the display window of the display portion 8.

The control circuit can limit the orientation or the enlargement magnification of a road map displayed on the display portion 8 to prevent the vehicle mark from straying or drifting on the display window. After the startup, the navigation device 2 according to the embodiment can prevent the driver from feeling uncomfortable or confused due to an incorrect travel guidance image that may be displayed on the display portion 8 until the zero point correction is successfully completed on the gyro sensor 22.

In the present embodiment, the position detection portion 4 corresponds to a detection portion. The control circuit 10 corresponds to an arithmetic processing portion and a control portion.

The display mode setup process performed by control circuit 10 includes the zero point correction process at S110 and S150 that implements a function as the arithmetic processing portion. The process at S130 and S170 to set the display mode implements a function as the control portion.

It is noted that a flowchart or the processing of the flowchart in the present disclosure includes sections (also referred to as steps), each of which is represented, for instance, as S100. Further, each section can be divided into several sub-sections while several sections can be combined into a single section. Furthermore, each of thus configured sections can be also referred to as a circuit, device, module, or means.

Other Embodiments

While there has been described an embodiment of the disclosure, the disclosure is not limited to the embodiment but is applicable to various embodiments within the spirit and scope of the disclosure.

For example, the correction-oriented display mode may limit or reduce information from being displayed on a display window in the normal display mode illustrated in FIG. 2A only by changing vehicle mark M1 to vehicle mark M2 that indistinctly or unrecognizably displays a travel direction. As another example, the correction-oriented display mode may limit or reduce display information by displaying only a road map without displaying the vehicle mark M1.

The correction-oriented display mode may limit or reduce the display information by displaying guidance message such as "Acquiring the current position. Please wait." to overlap with a normal travel guidance display window.

Figure 5A:
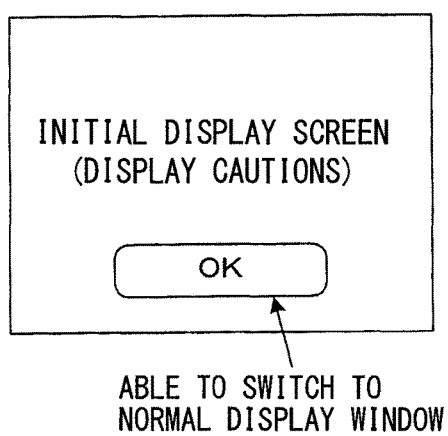
FIG. 5A and FIG. 5B are explanatory diagrams illustrating initial display windows corresponding to respective display modes.

A known navigation device displays an initial display window as illustrated in FIG. 5A at startup. When a user manipulates a confirmation button (an "OK" button in the drawing) on the initial display window, the display window changes to a travel guidance display window as illustrated in FIG. 2A.

Figure 5B:
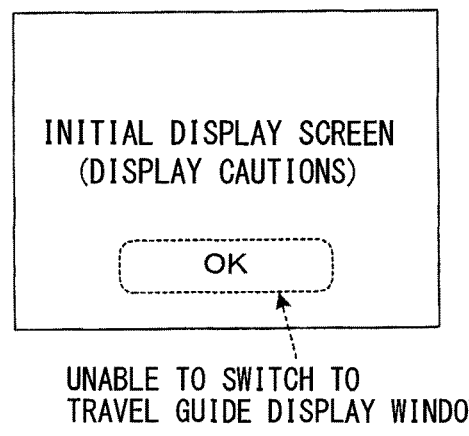

This kind of navigation device may display an initial display window as illustrated in FIG. 5B in the correction-oriented display mode. This initial display window disables manipulation of the confirmation button. When the zero point correction is successfully completed, the display window shown in FIG. 5B may change to the normal initial display window illustrated in FIG. 5A to permit transition from the initial display window to the travel guidance display window.

The display style in the correction-oriented display mode may be available as a first display style or a second display style. The first display style only displays the initial display window to limit or reduce display information. The second display style concerns above-described embodiment and limits or reduces display information so that the movement of a vehicle is indistinctly or unrecognizably displayed on a road map.

The zero point correction started immediately after startup of the navigation device 2 is interrupted when the vehicle is manipulated to start travelling before an expiration of the time period α+β ms. Herein, the time period α+β ms is required to complete the zero point correction after the startup of the navigation device 2 as illustrated in FIG. 3.

As described above, the time period α ms is required to stabilize an output from the gyro sensor 22. After the startup of the navigation device 2, until the time point t1 that comes after an elapse of the time period α ms, a change in the vehicle position cannot be detected even though an output from the gyro sensor 22 is corrected based on a zero point correction value obtained in the past.

However, an output from the gyro sensor 22 is in stable state during a time period between time point t1 and time point t2 after the startup of navigation device 2. Thus, a change in the vehicle position can be detected based on an output from the gyro sensor 22.

A display window displayed on the display portion 8 may be changed depending on whether the vehicle is manipulated to start travelling during time period α ms elapsed from the startup of the navigation device 2 to the time point t1 or during time period β ms elapsed from the time point t1 to the time point t2.

Figure 6:
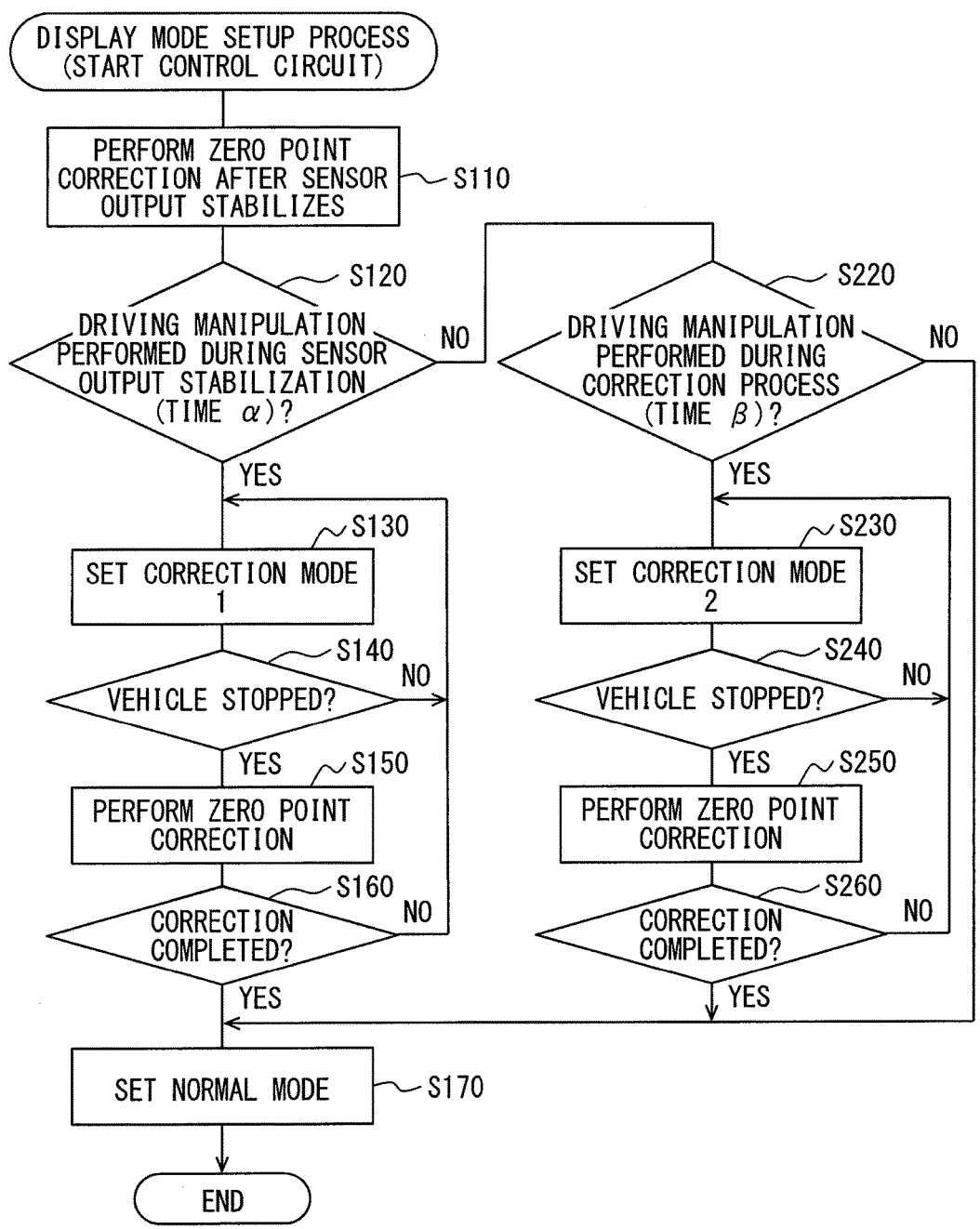
FIG. 6 is a flowchart illustrating a modification of the display mode setup process.

To do this, the display mode setup process may be performed as illustrated in FIG. 6. When the vehicle is manipulated to start travelling during the time period α ms elapsed from the startup of the navigation device 2 to the time point t1 (S120: YES), the control circuit 10 proceeds to S130 and enables a correction-oriented display mode 1 to display the initial display window illustrated in FIG. 5B (first display style).

When the vehicle is manipulated to start travelling during the time period β ms after the expiration of the time period α ms after the startup of the navigation device 2 (S220: YES), the control circuit 10 proceeds to S230 and enables a correction-oriented display mode 2 to display the travel guidance display window illustrated in FIG. 2B (second display style).

The control circuit 10 sets the display mode at S130 or S230. After that, the control circuit 10 waits at S140 through S160 or S240 through S260 until the zero point correction is successfully completed at the next stop of the vehicle. After the zero point correction is successfully completed, the control circuit 10 proceeds to S170 and changes the display mode to the normal display mode.

The display style (display mode) of the display portion 8 is changed before and after an output from the gyro sensor 22 is stabilized. Usability of the navigation device 2 can be improved by displaying more information (map or vehicle position in the example) after stabilization of an output from the gyro sensor 22 than before the stabilization.

Some drivers may feel uncomfortable or confused when the display mode is set to one of two correction-oriented display modes during a period from the startup of the navigation device 2 to the completion of the zero point correction on the gyro sensor 22. In such a case, guidance message such as "Acquiring the current position. Please wait." may be displayed separately.

Figure 7:
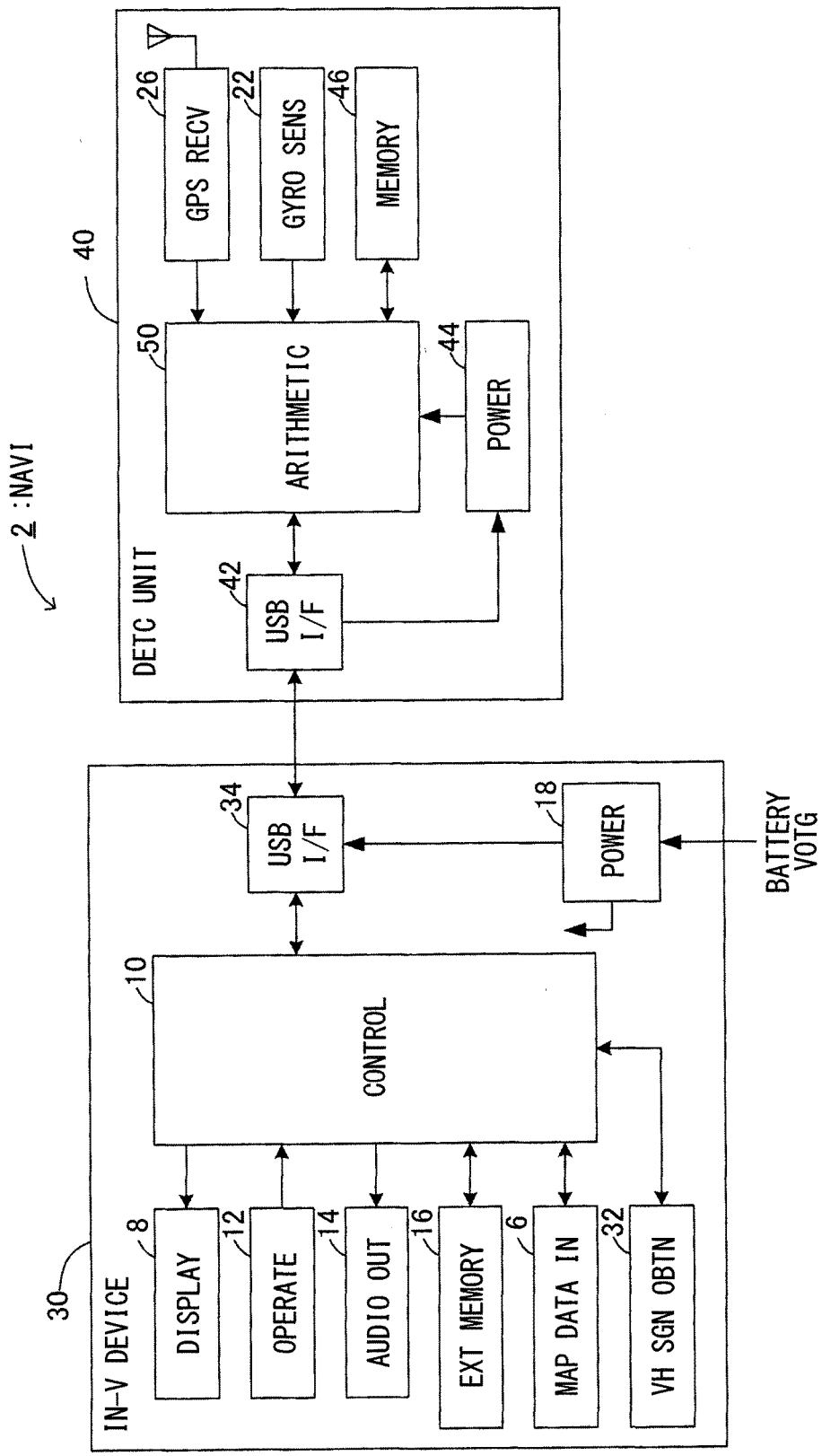
FIG. 7 is a block diagram illustrating another configuration of the vehicle navigation device according to another embodiment of the disclosure.

As illustrated in FIG. 7, the navigation device 2 is recently proposed to include an in-vehicle device (IN-V DEVICE) 30 using the navigation function of a mobile terminal such as a smartphone and a detection unit (DETC UNIT) 40 for position detection. In this configuration, the detection unit 40 functions as a detection portion.

In the navigation device 2 as illustrated in FIG. 7, an in-vehicle device 30 includes the map data input portion 6, the display portion 8, the manipulation portion 12, the audio output portion 14, the external memory 16, the power supply portion 18, the control circuit 10, and a vehicle signal obtaining portion (VH SGN OBTN) 32 to obtain vehicle information such as a vehicle speed.

The detection unit 40 includes the gyro sensor 22, the GPS receiver 26, an arithmetic circuit (ARITHMETIC) 50 for position detection, a power supply portion (POWER) 44 to supply power to these portions, and memory (MEMORY) 46 to store the vehicle's travel history.

The in-vehicle device 30 and the detection unit 40 include Universal Serial Bus interfaces (USB I/F) 34 and 42 for communication. The power supply portion 18 of the in-vehicle device 30 supplies a power supply voltage to the power supply portion 44 of the detection unit 40 via the USB I/F 34 and 42.

In this type of navigation device 2, when the control circuit 10 in the in-vehicle device 30 is started up and the USB I/F 34 starts supplying the power to the detection unit 40 under control of the control circuit 10. Then, the arithmetic circuit 50 in the detection unit 40 starts operation.

The arithmetic circuit 50 of the detection unit 40 incorporates the vehicle information such as a vehicle speed acquired by the in-vehicle device 30. The arithmetic circuit 50 uses known dead-reckoning navigation to detect the vehicle position and the travel direction based on the vehicle information and an output from the gyro sensor 22.

The arithmetic circuit 50 of the detection unit 40 performs zero point correction on the gyro sensor 22. After the in-vehicle device 30 starts operation, the time period required to complete the zero point correction is longer than the navigation device integrated with the position detection portion illustrated in FIG. 1.

After the navigation device 2 in FIG. 7 is started, a driver is highly likely to manipulate the vehicle before completion of the zero point correction.

The disclosure is more effectively applied to the navigation device 2 in FIG. 7 that includes the detection unit 40 as the position detection portion 4 separately from the in-vehicle device 30 as a navigation device body.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle navigation device comprising:
   a detection portion detecting a position and a travel direction of a vehicle and outputting a detection signal;
   an arithmetic processing portion specifying the position and the travel direction of the vehicle based on the detection signal output from the detection portion;
   a display portion displaying a road map and a vehicle mark corresponding to a display style; and
   a control portion controlling the display portion to display the vehicle mark on the road map in a normal display style, the vehicle mark in the normal display style indicating both the position and the travel direction of the vehicle specified by the arithmetic processing portion, wherein
   the detection portion includes a gyro sensor that detects an angular velocity of the vehicle,
   the arithmetic processing portion performs a zero point correction in order to set a zero point for an output from the gyro sensor under a condition that the vehicle maintains a stationary state after a startup of the vehicle navigation device, the control portion switches the display style of the display portion from the normal display style to a correction-oriented display style in response to the startup of the vehicle navigation device, the correction-oriented display style limits display information that is available in the normal display style, and the control portion maintains the correction-oriented display style as the display style of the display portion during a zero point correction period that is elapsed from the startup of the vehicle navigation device to a completion of the zero point correction, the zero point correction period includes a first period and a second period, the first period is a period that is elapsed from the startup of the vehicle navigation device to a stabilization of the output from the gyro sensor, and the second period is a period that is elapsed from the stabilization of the output from the gyro sensor to the completion of the zero point correction, when the vehicle starts to travel during the first period, the control portion controls the display portion to display, in the correction-oriented display style, an initial display window indicating that the startup of the vehicle navigation device is in progress until the arithmetic processing portion completes a next zero point correction, and when the vehicle starts to travel during the second period, the control portion controls the display portion to display, in the correction-oriented display style, a movement of the vehicle on the road map in an indistinct manner compared with the normal display style until the arithmetic processing portion completes the next zero point correction.

2. The vehicle navigation device according to claim 1, wherein,
in the correction-oriented display style maintained during the zero point correction period, the control portion controls the display portion to display an initial display window indicating that the startup of the vehicle navigation device is in progress.

3. The vehicle navigation device according to claim 1, wherein,
in the correction-oriented display style maintained during the zero point correction period, the control portion controls the display portion to display a movement of the vehicle on the road map in an indistinct manner compared with the normal display style.

4. The navigation device according to claim 1, wherein
the detection portion further includes the arithmetic processing portion and the detection portion is configured as a detection unit,
the display portion and the control portion are configured as a navigation device body separately from the detection unit,
the detection unit and the navigation device body are communicable with each other, and
the detection unit is supplied with power by the navigation device body and starts to operate after a startup of the navigation device body.

5. The navigation device according to claim 3, wherein
the display portion displays a vehicle mark indicating only the position of the vehicle on the road map as the display of the movement of the vehicle in the indistinct manner.

* * * * *